US012631133B2

(12) United States Patent
Arsa

(10) Patent No.: US 12,631,133 B2
(45) Date of Patent: May 19, 2026

(54) LUBRICANT FILTER SYSTEM, AIRCRAFT ENGINE, AND METHOD OF OPERATING A LUBRICANT SYSTEM

(71) Applicant: PRATT & WHITNEY CANADA CORP., Longueuil (CA)

(72) Inventor: Christophe Arsa, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 105 days.

(21) Appl. No.: 18/374,726

(22) Filed: Sep. 29, 2023

(65) Prior Publication Data

US 2025/0109701 A1 Apr. 3, 2025

(51) Int. Cl.
F01M 1/10 (2006.01)
F16N 21/00 (2006.01)
F16N 39/04 (2006.01)
B64D 27/24 (2006.01)

(52) U.S. Cl.
CPC .............. F01M 1/10 (2013.01); F16N 21/00 (2013.01); F16N 39/04 (2013.01); B64D 27/24 (2013.01); F01M 2001/1057 (2013.01); F01M 2001/1092 (2013.01); F16N 2210/14 (2013.01); F16N 2250/04 (2013.01); F16N 2270/26 (2013.01); F16N 2270/70 (2013.01); F16N 2280/04 (2013.01)

(58) Field of Classification Search
CPC ......................... F01M 1/10; F01M 2001/1057
See application file for complete search history.

(56) References Cited

U.S. PATENT DOCUMENTS

| | | | | | |
|---|---|---|---|---|---|
| 2,095,447 | A | * | 10/1937 | Lentz | B01D 35/143 210/333.1 |
| 2,978,108 | A | * | 4/1961 | Strassheim | B01D 29/668 210/488 |
| 4,324,213 | A | * | 4/1982 | Kasting | F01M 1/10 184/6.22 |
| 4,512,299 | A | * | 4/1985 | Egan | F01M 1/10 184/6.24 |
| 4,655,914 | A | * | 4/1987 | Wada | B01D 27/108 210/167.04 |
| 5,121,599 | A | | 6/1992 | Snyder et al. | |
| 5,298,158 | A | * | 3/1994 | Anderson | B01D 35/12 210/167.04 |
| 8,499,892 | B2 | * | 8/2013 | Cavarello | F16K 11/0856 184/6.28 |

(Continued)

FOREIGN PATENT DOCUMENTS

DE 202011005359 U1 10/2011

*Primary Examiner* — Michael A Riegelman
(74) *Attorney, Agent, or Firm* — Norton Rose Fulbright Canada LLP

(57) ABSTRACT

The lubricant filter system can have a first lubricant filter having a first inlet and a first outlet; a second lubricant filter having a second inlet and a second outlet; an inlet conduit; a first inlet branch fluidly connecting the inlet conduit to the first inlet; a second inlet branch fluidly connecting the inlet conduit to the second inlet; an outlet conduit; a first outlet branch fluidly connecting the first outlet to the outlet conduit; a second outlet branch fluidly connecting the second outlet to the outlet conduit; a bypass conduit fluidly connecting the inlet conduit to the outlet conduit; and a bypass valve controlling fluid passage through the bypass conduit.

15 Claims, 6 Drawing Sheets

(56)     References Cited

U.S. PATENT DOCUMENTS

|  |  |  |  |  |
|---|---|---|---|---|
| 8,540,054 | B2 * | 9/2013 | Cavarello | F16K 11/076 |
|  |  |  |  | 184/6.28 |
| 10,471,376 | B2 * | 11/2019 | Dengler | B01D 29/52 |
| 10,669,892 | B2 * | 6/2020 | Adique | F16N 7/40 |
| 2003/0127384 | A1 | 7/2003 | Kapur |  |
| 2008/0035544 | A1 * | 2/2008 | Rennie | F01M 11/03 |
|  |  |  |  | 210/167.04 |
| 2009/0215603 | A1 * | 8/2009 | Baumann | B04B 5/10 |
|  |  |  |  | 494/17 |
| 2011/0147322 | A1 | 6/2011 | Payne et al. |  |
| 2015/0184802 | A1 * | 7/2015 | Leising | F16N 39/02 |
|  |  |  |  | 184/6.22 |
| 2017/0028319 | A1 * | 2/2017 | Dong | B01D 27/142 |
| 2019/0093509 | A1 * | 3/2019 | Adique | F01M 1/10 |
| 2021/0060461 | A1 | 3/2021 | Polly et al. |  |
| 2022/0266179 | A1 * | 8/2022 | Yadav | F16L 41/03 |
| 2025/0109701 | A1 * | 4/2025 | Arsa | F01D 25/18 |

* cited by examiner

_FIG_-1

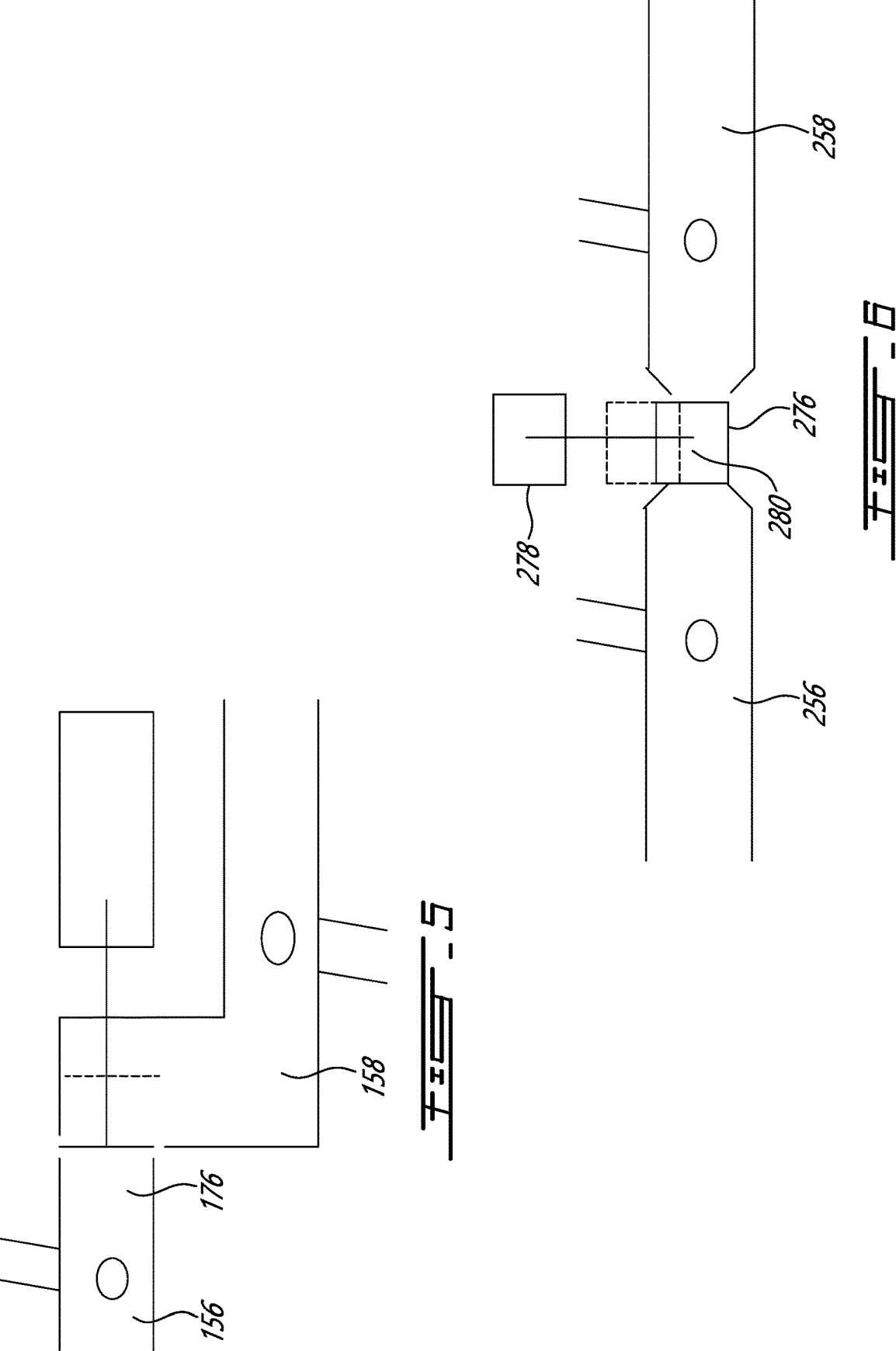

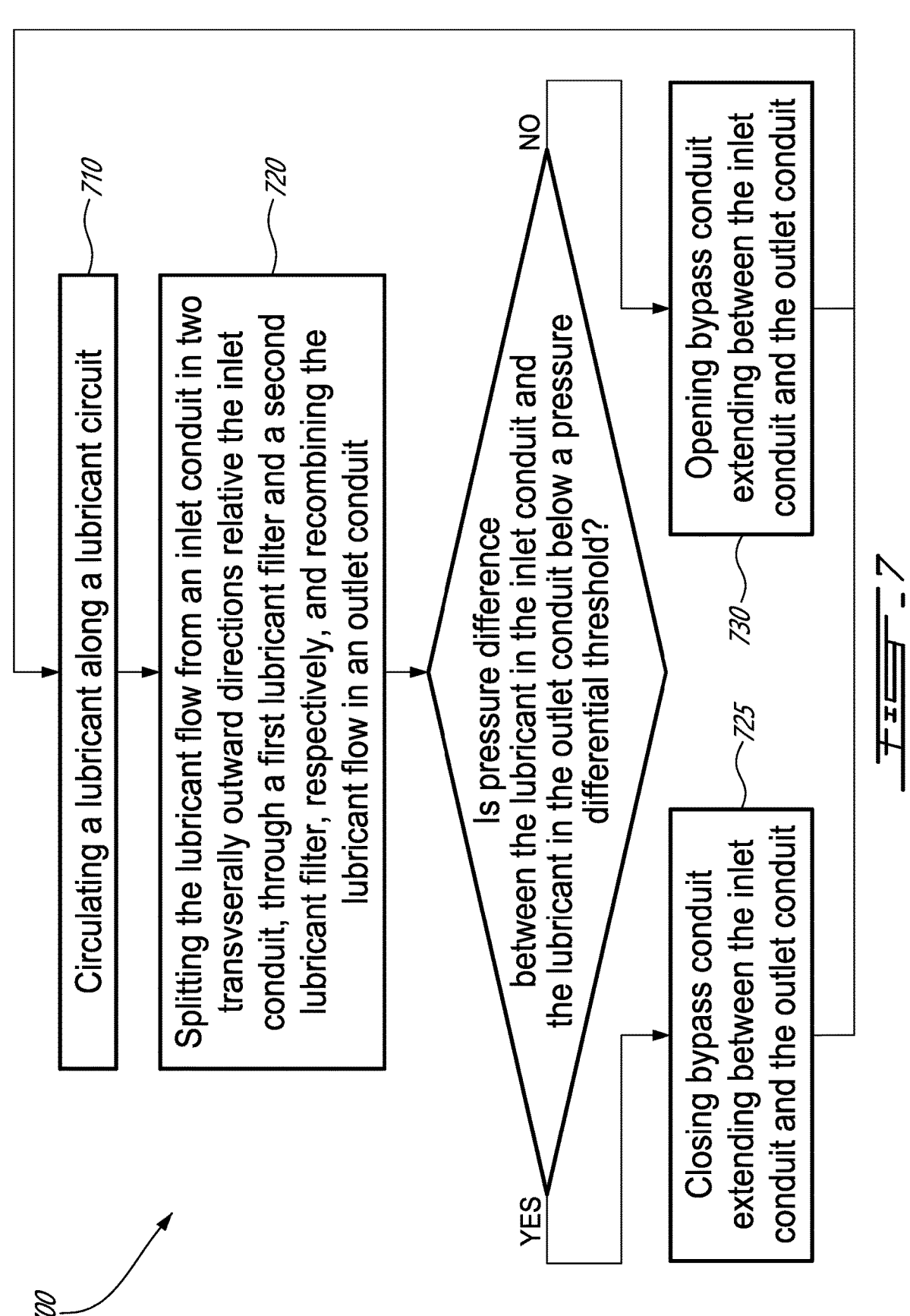
_FIG -7_

LUBRICANT FILTER SYSTEM, AIRCRAFT ENGINE, AND METHOD OF OPERATING A LUBRICANT SYSTEM

TECHNICAL FIELD

The application relates generally to aircraft engines and, more particularly, to lubricant systems thereof.

BACKGROUND OF THE ART

Many types of aircraft engines, such as electric, heat or hybrid, have one or more bearing-mounted rotary assemblies and lubricant systems configured to circulate a lubricant such as oil to and from the bearings. While existing lubricant systems were satisfactory to a certain degree, there always remains room for improvement. For instance, in recent years, there has been a strong market demand for engines incorporating electric machines, such as electric engines and hybrid heat/electric engines. The design of new engines poses new needs for technological solutions associated with the lubricant system, especially given the many different considerations which affect aircraft engine design such as weight, cost, durability, reliability, maintenance, etc.

SUMMARY

In one aspect, there is provided a lubricant filter system comprising: a first lubricant filter having a first inlet and a first outlet; a second lubricant filter having a second inlet and a second outlet; an inlet conduit; a first inlet branch fluidly connecting the inlet conduit to the first inlet; a second inlet branch fluidly connecting the inlet conduit to the second inlet; an outlet conduit; a first outlet branch fluidly connecting the first outlet to the outlet conduit; a second outlet branch fluidly connecting the second outlet to the outlet conduit; a bypass conduit fluidly connecting the inlet conduit to the outlet conduit; and a bypass valve controlling fluid passage through the bypass conduit.

In another aspect, there is provided an aircraft engine comprising: a rotary assembly supported by bearings, and a lubricant system configured for circulating a lubricant to and from the bearings, the lubricant system including a lubricant filter system, the lubricant filter system having a first lubricant filter having a first inlet and a first outlet; a second lubricant filter having a second inlet and a second outlet; an inlet conduit; a first inlet branch fluidly connecting the inlet conduit to the first inlet; a second inlet branch fluidly connecting the inlet conduit to the second inlet; an outlet conduit; a first outlet branch fluidly connecting the first outlet to the outlet conduit; a second outlet branch fluidly connecting the second outlet to the outlet conduit; a bypass conduit fluidly connecting the inlet conduit to the outlet conduit; and a bypass valve controlling fluid passage through the bypass conduit.

In a further aspect, there is provided a method of operating a lubricant system including: circulating a lubricant along a lubricant circuit; while circulating said lubricant, splitting the lubricant flow from an inlet conduit in two transversally outward directions relative the inlet conduit, through a first lubricant filter and a second lubricant filter, respectively, and recombining the lubricant flow in an outlet conduit; and while splitting the lubricant flow, engaging a valve member against a valve seat, the valve seat located in a bypass conduit extending between the inlet conduit and the outlet conduit, the valve member partitioning the lubricant flow in the inlet conduit from the lubricant flow in the outlet conduit.

As used herein, the singular forms "a," "an," and "the" are intended to include the plural forms as well, unless the context clearly indicates otherwise.

DESCRIPTION OF THE DRAWINGS

Reference is now made to the accompanying figures in which:

FIG. 5 is a schematic cross-sectional view of a lubricant filter system in accordance with another example;

FIG. 6 is a schematic cross-sectional view of a lubricant filter system in accordance with another example; and FIG. 7 is a flow chart of a method of operating a lubricant system.

DETAILED DESCRIPTION

Figure 1:
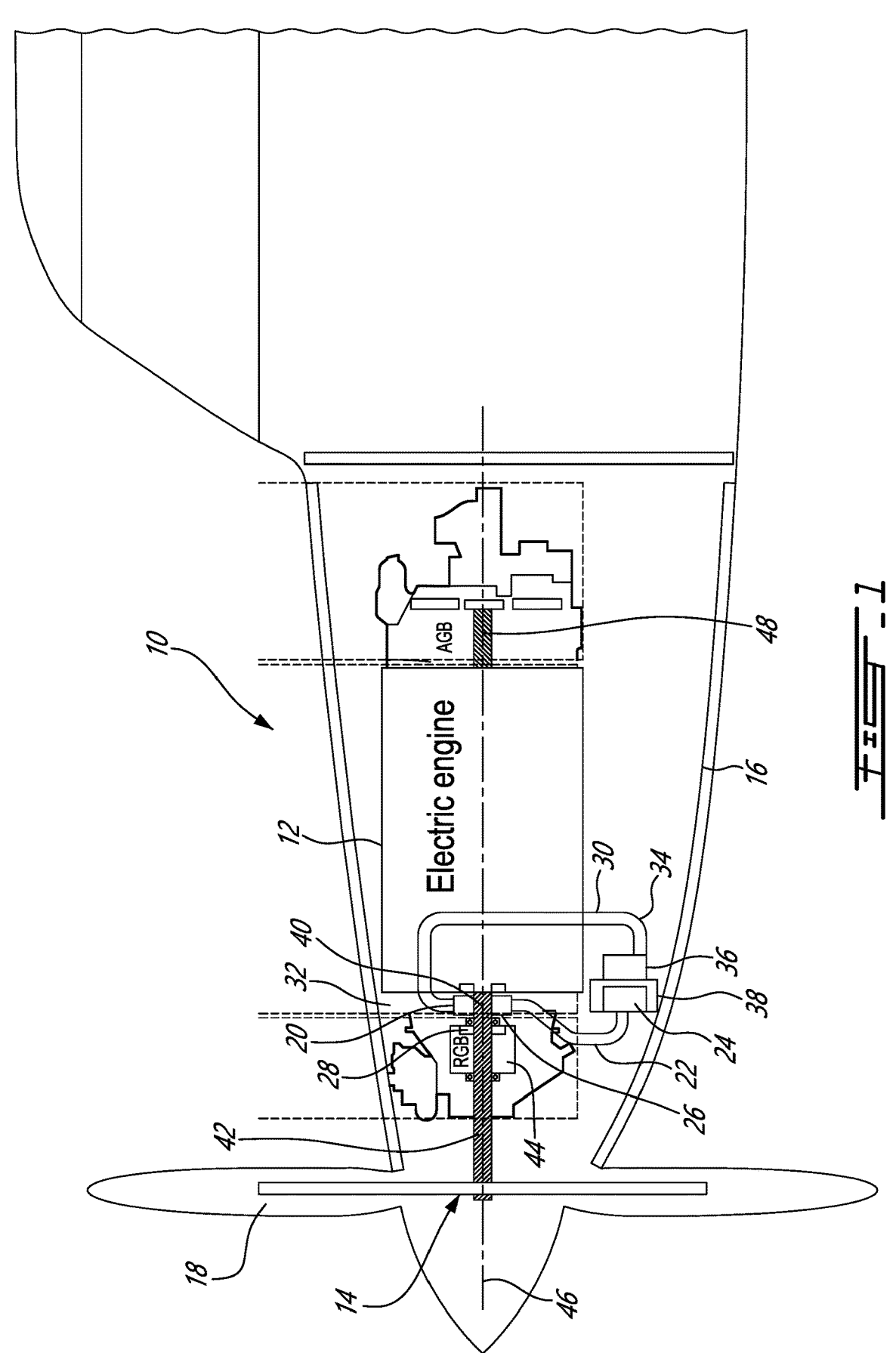
FIG. 1 is a schematic cross-sectional view of an aircraft engine.

FIG. 1 illustrates an example aircraft having an electric powerplant 10. The electric powerplant 10 includes an electric engine 12 drivingly coupled to a load, such a rotary airfoil device 14. In this example, the electric powerplant 10 is housed within a nose 16 of the aircraft and the rotary airfoil device 14 is provided in the form of a propeller 18, such as a variable-pitch propeller. In this example, the electric engine 12 has a first shaft which will be referred to here as a source shaft 40 and the rotary airfoil device 14 has an output shaft 42. The source shaft 40 and the output shaft 42 can form part of the drivetrain of the electric powerplant 10. In this example, the source shaft 40 is coupled to the output shaft 42 via a gearbox 44 having reduction gearing and acting here as a transmission. In one embodiment, the reduction gearing is an epicyclic gearing, and the source shaft 40 is rotatable around the same rotation axis 46 as the output shaft 42, in an in-line configuration. An alternate form of transmission may be used in an alternate embodiment. Moreover, the electric engine 12 also has a second shaft 48 coupled to an accessory gearbox (AGB) mechanically coupled to mechanically-driven accessories. Numerous variants are possible in different applications. For instance, in embodiments of drivetrains which are not shown, the reduction gearing can have an offset configuration, with the source shaft and the output shaft parallel but offset rather than an in-line configuration. In an alternate embodiment, the electric engine may have a single source shaft and the mechanically-driven accessories can all be mechanically coupled to a unique gearbox. In an alternate embodiment, the rotary airfoil device 14 may be enclosed within a ducted structure in a fan configuration. Moreover, in the case of a helicopter application, the rotary airfoil device may include helicopter blades, and the output shaft may or may not be parallel to the source shaft.

Independently of the details of a given embodiment, bearing assemblies 20, such as ball bearings, may be used to provide smooth relative rotation between one or more of the shafts and non-rotating components such as a casing, and/or between two shafts which rotate at different speeds. A lubricant system 22 including a lubricant pump 24, sometimes referred to as a main pump, and a network of conduits and nozzles 26, can be provided to feed engine components such as the bearings 20 and/or the gearbox 44 with a lubricant such as oil. In the case of bearings 20, seals 28 can be used to contain the oil. A scavenge system 30 having cavities 32, conduits 34, and one or more scavenge pumps 36, can be used to recover the oil, which can be in the form of an oil foam at that stage, from the bearings 20. The oil pump 24 draws the oil from an oil reservoir 38. Air/oil separating devices (not shown) may be provided in the return line. One or more lubricant filters can form part of a lubricant system and may be provided in the lubricant circulation circuit. One or more lubricant filters may more specifically form part of a lubricant filter system, which can also have a bypass to circumvent a lubricant filter in the case of a blockage. The flow through the bypass can be controlled by a bypass valve. The lubricant filter system can further include a pressure differential sensor configured to measure the difference in pressure between the inlet and the outlet of a filter. Lubricant can also be supplied to lubricate gearing, such as a reduction gearbox 44 and/or accessory gearbox, in which case such gearboxes may be provided with a lubricant sump or with an oil reservoir. Lubricant may be used not only for lubrication, but also for heat management, namely in cooling components which generate heat during operation, such as gearing (e.g. reduction gearing).

Other types of engines may be used in aviation. For instance, aircraft hybrid powerplants comprising a combination of electric and heat engines or aircraft powerplants with a heat engine only are contemplated, which may also use a lubrication system having a lubricant filter system with one or more lubricant filter. There can even be a motivation to retrofit an electric engine 12 to replace an existing, possibly ageing, heat engine in an aircraft. Either retrofitting an electric engine 12 to an existing aircraft or designing an aircraft for receiving a new engine may involve taking certain aspects into consideration. For example, in the example presented in FIG. 1, housing an engine 12 in an aircraft may be affected by engine installation constraints such as engine cowling of a narrow or otherwise limited body shape and size (which may be tied to propeller thrust efficiency, pilot visibility, and aircraft performance-drag, for instance), the presence of a cabin firewall, or a propeller plane axial position, to name some examples, which may impose particular limits in terms of dimensions or volume, in addition to other typical considerations in aviation such as cost (production and maintenance), weight, reliability, etc. While the illustrated example is but one instance of many different possible engine arrangements, many aircraft engines are affected by limited dimensions or volume in addition to other typical considerations in aviation such as cost (production and maintenance), weight, reliability, etc.

Various design considerations may motivate an aircraft designer to introduce two or more lubricant filters rather than a single lubricant filter within a lubricant filter system. This can be simply due to the limited amount of available models of lubricant filters and the extent of mismatch between a capacity of available lubricant filters and the lubricant filtration specification. The lubricant filtration specification may include a flow rate specification, and may also include dimensional specifications for lubricant passages. An optimal way of achieving a given lubricant filtration specification may be to include two filters. In a first example, there may not be a model of lubricant filter available which satisfies a lubricant filtration specification, and a suitable way of satisfying the specification, apart from designing a new lubricant filter, may be to use two or more filters. In a second example, if an existing model of filter which most closely matches, while satisfying, the filtration specification significantly exceeds the filtration specification, such a model may impart significant excess weight and volume to the engine, and the filtration specification may be more efficiently met by two filters of a smaller model which, when combined, more closely match the filtration specification. The lubricant filtration specification may be affected by the need to achieve a given flow rate of lubricant, and/or the need to use lubricant which has a given density. Higher flow rates and higher densities of lubricant typically increase the lubricant filtration specifications. 15W50 oil, used in hybrid-electric propulsion, is an example of high density oil which may affect the lubricant filtration specification.

One way to introduce two (or more) lubricant filters in a lubricant system is to introduce the lubricant filters in series or in parallel relative the lubricant circuit. In such a scenario, each lubricant filter may be associated to a dedicated bypass conduit controlled by a dedicated bypass valve. Moreover, in such a scenario, each lubricant filter may have a dedicated sensor. The sensor can be responsible for signaling a possible malfunction of the lubricant filter, or simply to provide an measurement which can be used, for instance, in determining when preventive maintenance should be scheduled. An example of such a sensor can be a pressure differential sensor responsible for measuring the pressure drop between the inlet and the outlet of a given one of the lubricant filters for instance. Including all these components (bypass conduits, bypass valves, sensors) can impart a certain amount of weight, dimensions, volume and/or cost, any and potentially all of which may be desired to be limited.

Figure 2:
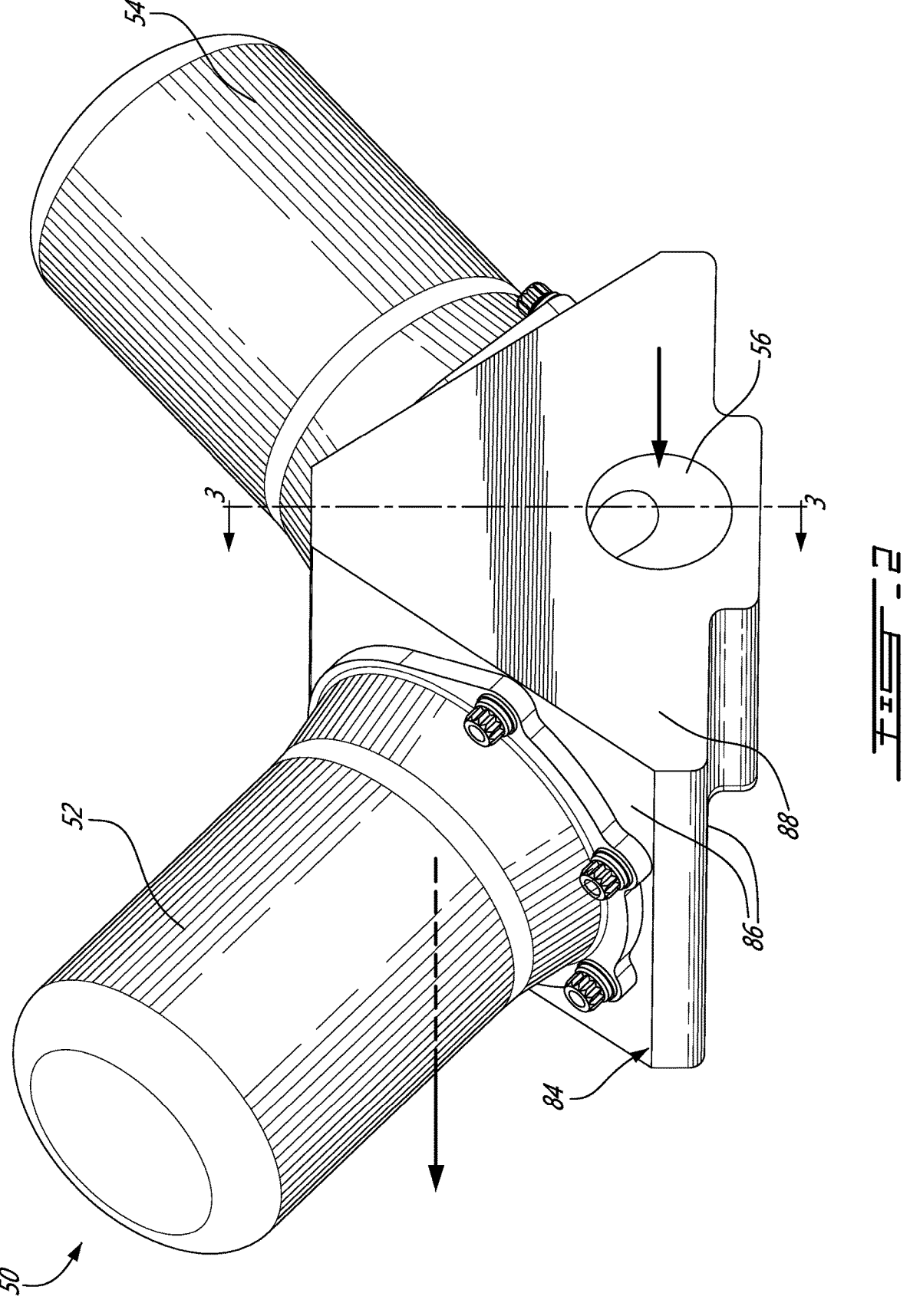
FIG. 2 is an oblique view of a lubricant filter system.
Figure 3:
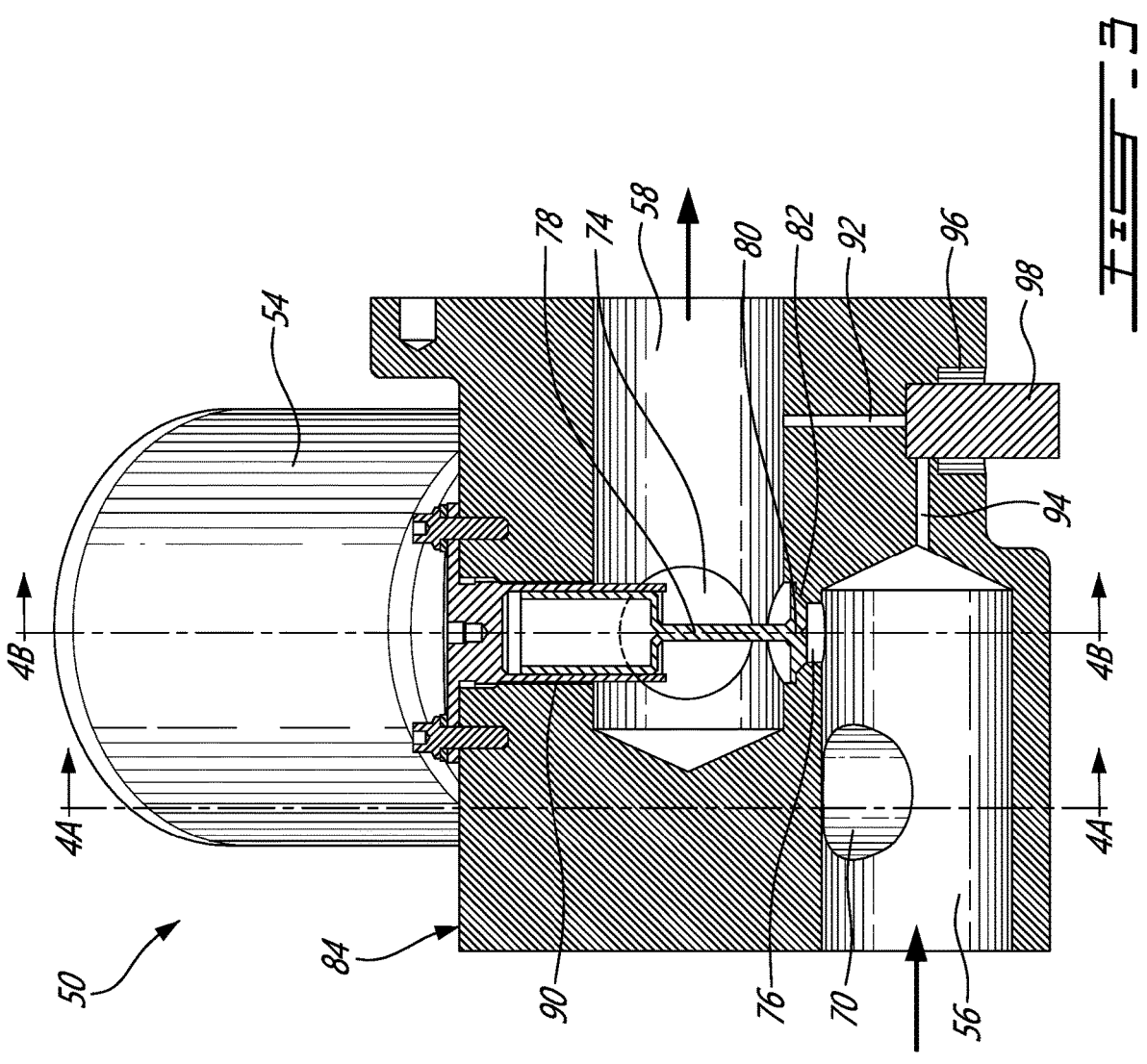
FIG. 3 is a cross-section view taken along cross-section lines 3-3 of FIG. 2.

FIGS. 2 to 4 present an example lubricant filter system 50 embodying an alternate way of introducing more than one lubricant filter. As will be explained in greater detail below, such an alternate way of introducing lubricant filters may allow the sharing of one or more of a bypass (valve and conduit) and a sensor between the lubricant filters, which may allow an initial cost reduction, a maintenance-related cost reduction, and/or a weight reduction, for instance, depending on the exact embodiment. Moreover, such an alternate way of introducing two lubricant filters may allow reducing the footprint of the lubricant filter subsystem, such as by reducing the volume, satisfying one or more dimensional specification, and/or satisfying a specification pertaining to a geometry of available space for lubricant filters.

The lubricant filter system 50 can have a first lubricant filter 52 and a second lubricant filter 54. The expressions first and second are used here arbitrarily as labels, simply to allow distinguishing one from the other. The two lubricant filters 52, 54 can be identical or different.

As seen more clearly in FIG. 3, the lubricant filter system 50 can have an inlet conduit 56 and an outlet conduit 58, both of which may be common to both the first lubricant filter 52 and the second lubricant filter 54.

Figures 4A, 4B:
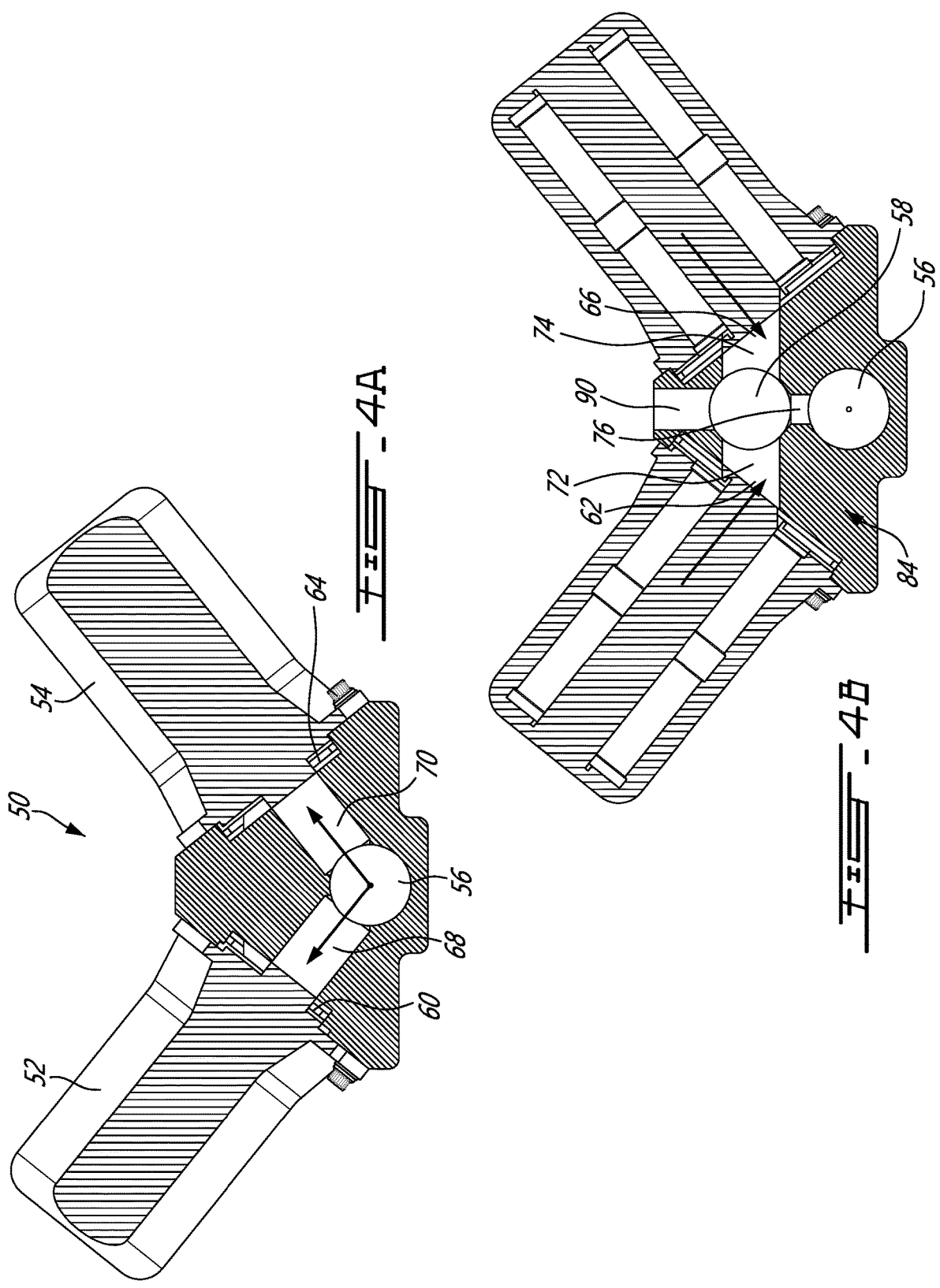
FIGS. 4A and 4B are cross-section views taken along cross-section lines 4A-4A and 4B-4B of FIG. 3, respectively.

As seen more clearly in FIGS. 4A and 4B, the first lubricant filter 52 has a first inlet 60 and a first outlet 62, and the second lubricant filter 54 has a second inlet 64 and a second outlet 66. A first inlet branch 68 fluidly connects the inlet conduit 56 to the first inlet 60, and a second inlet branch 70 fluidly connects the inlet conduit 56 to the second inlet 64. A first outlet branch 72 fluidly connects the first outlet 62 to the outlet conduit 58 and a second outlet branch 74 fluidly connects the second outlet 66 to the outlet conduit 58.

Referring back to FIG. 3, in this embodiment, the inlet conduit 56 and the outlet conduit 58 are straight, oriented parallel to one another, though offset from one another, and the first outlet branch 72, second outlet branch 74, first inlet branch 68 and second inlet branch 70 extend transversally to the orientation of the inlet conduit 56 and of the outlet conduit 58. In this embodiment, the first inlet branch 68 extends obliquely relative the first outlet branch 72, and is longitudinally offset therefrom, and the second inlet branch 70 extends obliquely relative the second outlet branch 74, and is longitudinally offset therefrom.

The lubricant filter system 50 further has a bypass conduit 76 fluidly connecting the inlet conduit 56 to the outlet conduit 58. During a typical mode of operation, the bypass conduit 76 is closed by a bypass valve 78, present in FIG. 3, forcing the lubricant through both filters 52, 54 via the inlet and outlet branches 68, 70, 72, 74. More specifically, in this embodiment, the bypass valve 78 has a valve member 80 and the bypass valve 78 has a valve body or stem extending across the outlet conduit 58. The bypass conduit 76 has a valve seat 82. The bypass valve 78 has a valve member 80, and more specifically a disk in the illustrated embodiment, which can be biased against the valve seat 82. In one embodiment, the valve member 80 can be spring-biased, for instance, and the force of the bias can be calibrated in a manner for the valve member 80 to yield against the pressure differential between the inlet conduit 56 and the outlet conduit 58 when the pressure differential exceeds a given threshold value. In an alternate embodiment, the valve member 80 can be actively controlled such as, for instance, based on a measurement of the pressure differential between the inlet conduit 56 and the outlet conduit 58, in which case the valve member 80 can be controlled to retract into the outlet conduit 58, allowing fluid flow through the bypass conduit 76, when the pressure differential measurement reaches or exceeds a given threshold value. Various alternative designs are possible in different embodiments, in view of different contexts and applications.

In the embodiment illustrated, the first lubricant filter 52 and the second lubricant filter 54 are oriented transversally to the inlet conduit 56 and to the outlet conduit 58. The first lubricant filter 52 and the second lubricant filter 54 are oriented partially opposite from one another. The inlet conduit 56 and the outlet conduit 58 are both located between the first lubricant filter 52 and the second lubricant filter 54.

In the embodiment illustrated, each one of the inlet conduit 56, outlet conduit 58, first inlet branch 68, first outlet branch 72, second inlet branch 70, second outlet branch 74, and bypass conduit 76 are defined in a unitary component (e.g., a solid block of material) which will be referred to herein as a manifold 84. The manifold 84 generally has a triangular prism shape, with three transversal faces 86 connecting two end faces 88. In this embodiment, for simplicity, the three transversal faces 86 were made rectangular and the two end faces 88 were made triangular, and more specifically equilateral triangular, though it will be understood that many variants may be embodied as alternatives. In the illustrated embodiment, the first lubricant filter 52 is mounted to a first one of the transversal faces 86, and the second lubricant filter 54 is mounted to a second one of the transversal faces 86 to form a V-shaped filtration unit as best shown in FIG. 2. The inlet conduit 56 extends into the manifold 84 from a first one of the two end faces 88, and the outlet conduit 58 extends into the manifold 84 from a second one of the two end faces 88. Such an geometrical configuration may be useful in some embodiments, such as to allow the fitting of the lubricant filter system 50 into a predefined space having geometrical and volumetric limitations. In an alternate embodiment, the manifold 84 may have a rectangular prism shape, and the first lubricant filter 52 and the second lubricant filter 54 may be mounted to two opposite ones of four transversal faces, or two orthogonal ones of four transversal faces for instance.

In the illustrate embodiment, as best seen in FIG. 2, the inlet conduit 56 and the outlet conduit 58 are parallel, but offset from one another, and have a partially overlapping length at a location corresponding to the position of the bypass conduit 76. Such an arrangement can be convenient if the manifold 84 is to be manufactured by machining, for instance. Indeed, in such a context, the inlet conduit 56 can be formed by drilling into a first end face 88, the outlet conduit 58 can be formed by drilling into a second end face 88, and the bypass conduit 76, together with a valve socket 90 and the valve seat 82, can be formed by drilling or boring transversally across the manifold 84, through the outlet conduit 58, normal to the orientation of both the inlet conduit 56 and the outlet conduit 58. Similarly, inlet branches 68, 70 and outlet branches 72, 74 can be machined by drilling transversally from the external faces of the manifold 84 to the respective conduits 56, 58.

As best seen in FIG. 3, the latter arrangement can be further convenient in that it may facilitate the drilling of two pressure sensing conduits 92, 94, respectively connecting a corresponding one of the inlet conduit 56 and outlet conduit 58 to a sensor socket 96. In this embodiment, for instance, a first pressure sensing conduit 92 can be machined by drilling a narrow hole into the end of the inlet conduit 56, reaching the sensor socket 96, and a second pressure sensing conduit 94 can be machined by drilling a thin hole into the end of the sensor socket 96, reaching the outlet conduit 58.

The sensor socket 96 can be adapted to receiving a sensor 98 which can have a first sensing port fluidly connected to the first pressure sensing conduit 92, and a second sensing port fluidly connected to the second pressure sensing conduit 94. The sensor 98 can be configured to measure a pressure difference between the two ports, and thus adapted to measure the pressure difference between the inlet conduit 56 and the outlet conduit 58 when received in the sensor socket 96, during operation of the engine. Accordingly, the sensor 98 can be a pressure differential sensor.

It will be understood that while the detailed configuration of conduits and sockets presented in the illustrated embodiment may indeed be convenient in some embodiments, various alternatives may be used in alternate embodiments, particularly if a designer is not concerned by simplifying the design or optimizing it for machining for instance. For instance, in some embodiments, the inlet conduit and the outlet conduit may be somewhat oblique from one another rather than being parallel. Moreover, while the inlet conduit and the outlet conduit both have the same fluid direction in the illustrated embodiment, and therefore extend into the manifold from opposite end faces, in an alternate embodiment, the inlet conduit and the outlet conduit may have opposite fluid directions and extend into the manifold from a same end face, for instance.

Further variants are possible, such as illustrated for example in FIG. 5, where the outlet conduit 158 may have a more complex geometrical shape, the bypass conduit 176 may be embodied as a linear extension to the inlet conduit 156, and the valve orientation may be aligned with an axis of the inlet and bypass conduits 156, 176. Another potential example is presented in FIG. 6 where the inlet conduit 256, the outlet conduit 258, and the bypass conduit 276 are all aligned along a common axis, with the valve 278 having a valve member 280 which can be moved between an obstructing position in the bypass conduit 276, between the ends of the inlet conduit 256 and the outlet conduit 258, and a flow position (shown in dashed lines) where it unblocks the bypass conduit 276 to allow flow between the inlet conduit 256 and the outlet conduit 258.

FIG. 7 presents an example method of operating a lubricant system 700. The example method includes circulating 710 a lubricant along a lubricant circuit. The example method includes splitting 720 the lubricant flow from an inlet conduit in two transversally outward directions relative the inlet conduit, through a first lubricant filter and a second lubricant filter, respectively, and recombining the lubricant flow in an outlet conduit. The example method can include closing 725 the bypass conduit when the pressure difference between the lubricant in the inlet conduit and the lubricant in the outlet conduit is below a pressure differential threshold, and opening 730 the bypass conduit when the pressure difference between the lubricant in the inlet conduit and the lubricant in the outlet conduit is at or above the pressure differential threshold. The example method can include controlling the position of a valve member relative a valve seat, the valve seat located in a bypass conduit extending between the inlet conduit and the outlet conduit, the valve member partitioning the lubricant flow in the inlet conduit from the lubricant flow in the outlet conduit when engaged with the valve seat. The steps of circulating 710, splitting 720, and either one of closing 725 and opening 730 the bypass conduit can be performed at a same time.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine comprising:
   a rotary assembly supported by bearings, and a lubricant system operable to circulate a lubricant to and from the bearings, the lubricant system including a lubricant filter system, the lubricant filter system having:
   a first lubricant filter having a first inlet and a first outlet;
   a second lubricant filter having a second inlet and a second outlet;
   an inlet conduit fluidly connected to the first and second lubricant filters via a first and a second inlet branch, the first inlet branch fluidly connecting the inlet conduit to the first inlet of the first lubricant filter, the second inlet branch fluidly connecting the inlet conduit to the second inlet of the second lubricant filter;
   an outlet conduit fluidly connected to the first and second lubricant filters via a first and a second outlet branch, the first outlet branch fluidly connecting the first outlet of the first lubricant filter to the outlet conduit, the second outlet branch fluidly connecting the second outlet of the second lubricant filter to the outlet conduit;
   a bypass conduit fluidly connecting the inlet conduit to the outlet conduit; and
   a bypass valve controlling fluid passage through the bypass conduit:
   further comprising a manifold generally having a triangular prism shape with three transversal faces connecting two end faces, wherein the first lubricant filter is mounted to a first one of the transversal faces, the second lubricant filter is mounted to a second one of the transversal faces, the inlet conduit extends into the manifold from a first one of the two end faces, and the outlet conduit extends into the manifold from a second one of the two end faces.

2. The aircraft engine of claim 1 wherein a valve seat is formed at the bypass conduit, the bypass valve extending across the outlet conduit and having a valve member biased against the valve seat, the valve member preventing flow through the bypass conduit unless a pressure differential between the inlet conduit and the outlet conduit overcomes the bias of the valve member against the valve seat.

3. The aircraft engine of claim 1 further comprising a pressure differential sensor having a first port fluidly connected to the inlet conduit and a second port fluidly connected to the outlet conduit.

4. The aircraft engine of claim 1 wherein the inlet conduit is straight and parallel to the outlet conduit.

5. The aircraft engine of claim 4 wherein the inlet conduit and the outlet conduit have a same fluid direction.

6. The aircraft engine of claim 4 wherein the inlet conduit is offset from the outlet conduit transversally relative an orientation of the inlet conduit.

7. The aircraft engine of claim 1 wherein the first lubricant filter is oriented at least partially opposite the second lubricant filter.

8. The aircraft engine of claim 1 wherein the first lubricant filter and the second lubricant filter are oriented transversally to the inlet conduit and to the outlet conduit.

9. The aircraft engine of claim 1 wherein the inlet conduit and the outlet conduit are located between the first lubricant filter and the second lubricant filter.

10. A lubricant filter system comprising:
    a first lubricant filter having a first inlet and a first outlet;
    a second lubricant filter having a second inlet and a second outlet;
    an inlet conduit;
    a first inlet branch fluidly connecting the inlet conduit to the first inlet of the first lubricant filter;
    a second inlet branch fluidly connecting the inlet conduit to the second inlet of the second lubricant conduit;
    an outlet conduit;
    a first outlet branch fluidly connecting the first outlet of the first lubricant filter to the outlet conduit;
    a second outlet branch fluidly connecting the second outlet of the second lubricant filter to the outlet conduit;
    a bypass conduit fluidly connecting the inlet conduit to the outlet conduit; and
    a bypass valve controlling fluid passage through the bypass conduit;
    further comprising a manifold generally having a triangular prism shape with three transversal faces connecting two end faces, wherein the first lubricant filter is mounted to a first one of the transvers faces, a second lubricant filter is mounted to a second one of the transversal faces, the inlet conduit extends into the manifold from a first one of the two end faces, and the outlet conduit extends into the manifold from a second one of the two end faces.

11. The lubricant filter system of claim 10 wherein a valve seat is formed at the bypass conduit, the bypass valve extending across the outlet conduit and having a valve member biased against the valve seat, the valve member preventing flow through the bypass conduit unless a pressure differential between the inlet conduit and the outlet conduit overcomes the bias of the valve member against the valve seat.

12. The lubricant filter system of claim 10 further comprising a pressure differential sensor having a first port fluidly connected to the inlet conduit and a second port fluidly connected to the outlet conduit.

13. The lubricant filter system of claim 10 wherein the inlet conduit is straight and parallel to the outlet conduit.

14. The lubricant filter system of claim 13 wherein the inlet conduit and the outlet conduit have a same fluid direction.

15. The lubricant filter system of claim 13 wherein the inlet conduit is offset from the outlet conduit transversally relative an orientation of the inlet conduit.

* * * * *